March 17, 1970  R. JAGMINAS  3,500,524
ADJUSTABLE-DEFLECTION ROLL
Filed March 29, 1968  3 Sheets-Sheet 1
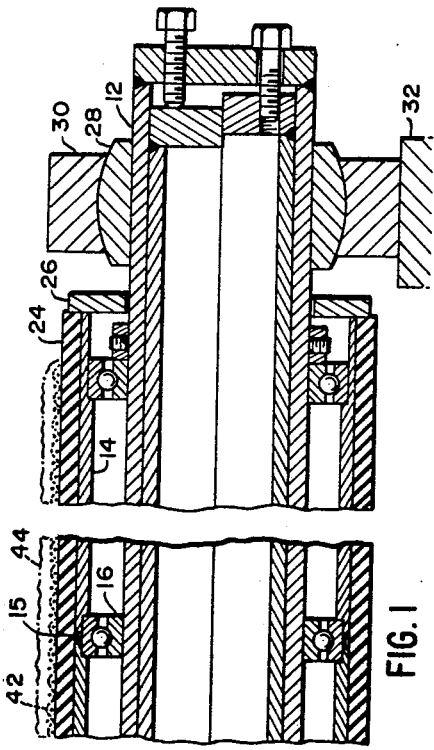
FIG. 1
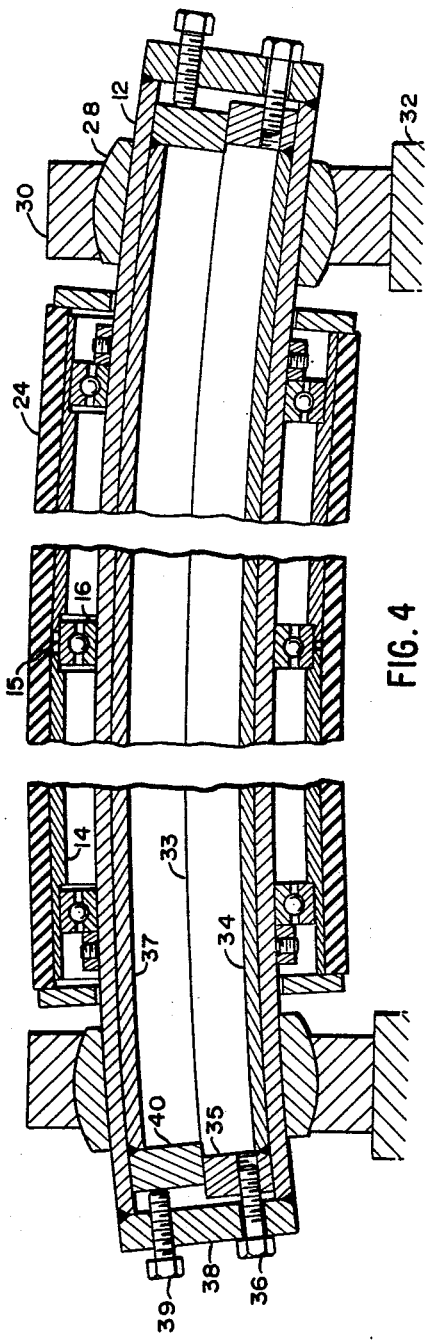
FIG. 4
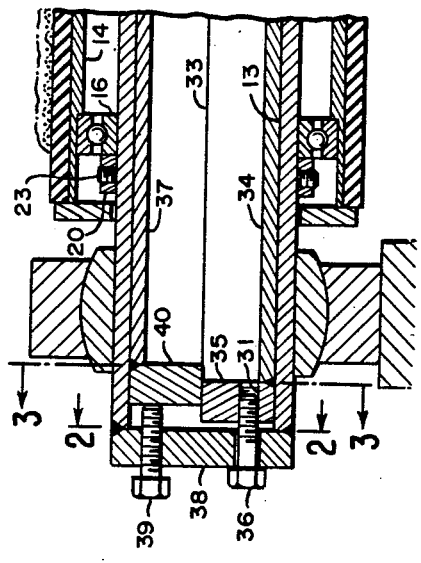
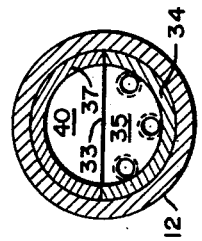
FIG. 3
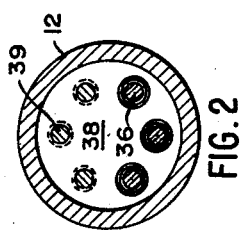
FIG. 2
INVENTOR.
ROMUALDAS JAGMINAS
BY
Kenway, Jenney & Hildreth
ATTORNEYS

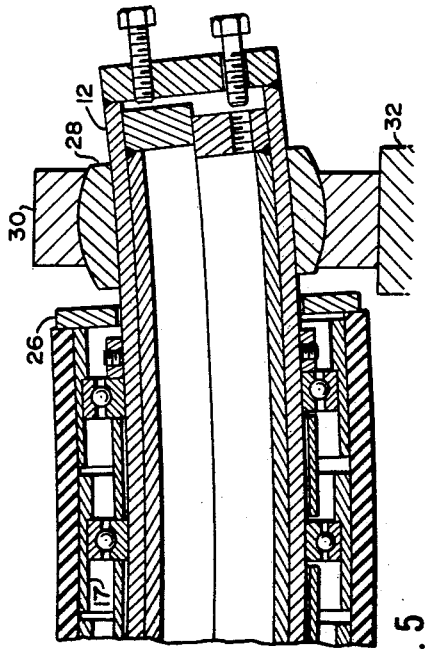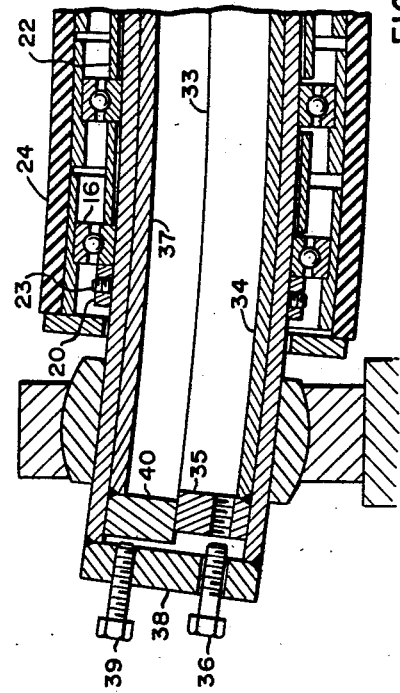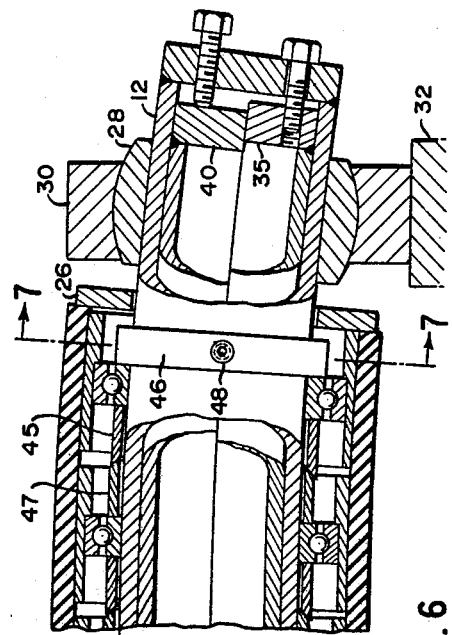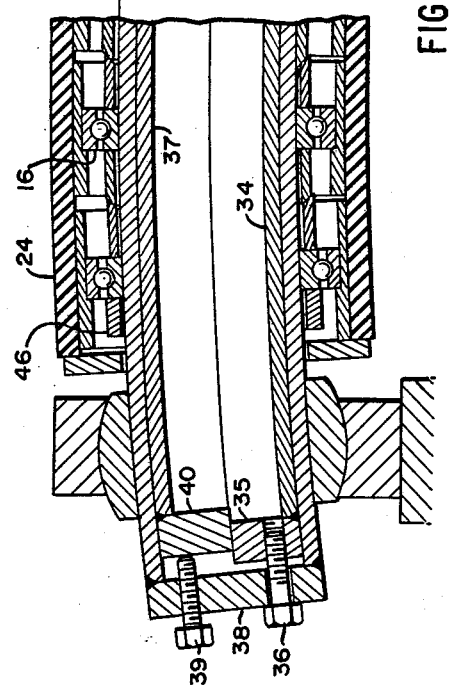

March 17, 1970  R. JAGMINAS  3,500,524
ADJUSTABLE-DEFLECTION ROLL

Filed March 29, 1968  3 Sheets-Sheet 3

INVENTOR.
ROMUALDAS JAGMINAS
BY
Kenway, Jenney & Hildreth
ATTORNEYS

United States Patent Office 3,500,524
Patented Mar. 17, 1970

3,500,524
ADJUSTABLE-DEFLECTION ROLL
Romualdas Jagminas, Bridgewater, Mass., assignor to Mount Hope Machine Company, Incorporated, Taunton, Mass., a corporation of Massachusetts
Filed Mar. 29, 1968, Ser. No. 717,245
Int. Cl. B21b 13/02
U.S. Cl. 29—116                                    7 Claims

ABSTRACT OF THE DISCLOSURE

An adjustable-deflection roll has an axle formed with a longitudinal cavity, in which compression and tension members are closely but slidably received; they lie on opposite sides of a neutral bending axis. These members contribute to the cross-sectional moment of inertia and thus to the stiffness of the axle. Means for compressing one member, and tensioning the other, apply corresponding reactions to the axle on either side of the neutral bending axis, to adjust the form of the axle to or from a straight or curved shape. The device is useful, for example, in straightening table rolls and bending expander rolls.

BACKGROUND AND BRIEF DESCRIPTION OF THE INVENTION

There are a number of uses of rolls in industrial processes for which the reduction of roll diameter is highly beneficial, for the sake of cost-reduction, reduction of space requirements, and product improvement in certain processes. The general object of this invention is to reduce the roll diameter required for various process applications, or conversely to improve the load-carrying capability of rolls of given diameters, thereby to realize the potential virtues of small-diameter rolls more fully.

The practical load-carrying capacity of a roll depends in large part on its resistance to transverse bending, or the ability to hold a desired shape, whether this be straight or curved. Considering a given roll length and diameter, and a specified roll material having a characteristic modulus of elasticity, the remaining variable factor contributing to transverse stiffness is the cross-sectional moment of inertia. The factors adversely affecting the roll's ability to assume a correct shape include machining errors, and deflection induced by the weight of the supported load and that of the roll itself. As the cross-sectional dimensions of the roll affect both its weight and its transverse moment of inertia, the first step toward achieving maximum conformity to the proper roll shape is to use the cross-section having the maximum moment of inertia for the minimum of mass, which is a hollow cylinder.

But another quite different expedient has been suggested by the prior art to further improve the ability of a roll to hold its correct form. This is essentially the use of a tension rod which passes longitudinally through the hollow cylindrical axle of a roll, and is eccentric to its neutral bending axis or major axis. The rod applies a reaction in compression to the axle in a manner to induse a curvature opposite to that which is to be imposed by the weight of the roll and by an applied load. U.S. Patent No. 3,094,771, issued June 25, 1963 to J. D. Robertson, and U.S. Patent No. 3,099,072, issued July 30, 1963 to J. D. Robertson and G. P. Knapp, each relating to "Table Roll with Means for Removing Longitudinal Curvature," each describe and claim rolls incorporating this measure. An extension of this principle to an axle subdivided into a number of sections, for individual alignment by a series of tension rods, is described and claimed in U.S. patent application Ser. No. 551,676, entitled "Non-Deflecting Roll" filed May 20, 1966 by J. D. Robertson. The application of the method to a roll having a fluid bearing, which makes it feasible to reduce the outside roll diameter still further without loss of stiffness by eliminating the radial clearance which would otherwise be occupied by conventional roller bearings, appears in U.S. Patents 3,386,148 and 3,386,149 entitled "Fluid Bearing Table Roll" issued June 4, 1968 to J. D. Robertson.

The method shown by the foregoing patents has the general limitation that, since the tension rod must lie within the axle relatively close to its axis, and has a solid circular cross-section, it does not contribute so much to the moment of inertia, in proportion to its mass, as does the axle itself.

It is a particular object of the present invention to provide an improved construction for straight rolls which permits a further reduction in diameter for a given stiffness, and which provides for adjustment of roll curvature to eliminate transverse deflection. This construction is useful in many applications where straight cylindrical rolls are required, including table rolls, press rolls, idler rolls, and many other types used for handling or treating sheet mateirals such as cloth, paper, plastic film, foil, and the like.

The invention is also applicable to curved rolls as variously employed for laterally expanding flexible sheet materials of cloth, paper, plastic film, foils and the like, to remove wrinkles and control sheet width, and also for correcting bow distortion in the weft or filler elements of woven webs.

It is accordingly another object of the invention to provide an improved construction for curved rolls, which can be made smaller, lighter, and cheaper for a given application than previously-known curved rolls. A greater degree of stability of form is also exhibited. This construction also provides a convenient means for changing the curvature of the roll.

In connection with curved rolls, U.S. Patent No. 2,689,-392, issued Sept. 21, 1954 to J. D. Robertson for "Adjustable Curvature Expander Roll And The Like," and U.S. Patent No. 2,898,662, issued Aug. 11, 1959 to J. D. Robertson for "Expanding and Contracting Rolls," both disclose adjustably-curved rolls in which the axle is longitudinally divided along a neutral bending axis, either by slitting a solid axle or by building one up from flat leaves. Threaded bending means apply tension to half of the axle, and compression to the other half lying on the opposite side of the neutral bending axis, so that curvature is induced. Bearings for the roller sleeve are mounted directly on the stationary axle. These axles exhibit a smaller ratio of cross-sectional moment of inertia to weight than the axles of the present invention, and are relatively massive and large in diameter.

According to the present invention, an adjustable deflection roll has an axle with a longitudinal internal cavity; the axle preferably takes the form of a hollow circular cylinder. A compression member and a tension member are snugly fitted in the cavity, extending lengthwise and meeting substantially on a diametral plane of the axle, which includes its neutral axis of transverse bending. These members are longitudinally slidable relative to one another and to the axle. They preferably take the form of hemicylinders, since this configuration, in conjunction with the cylindrical form of the axle itself, gives the greatest composite cross-sectional moment of inertia relative to the mass and diameter of the assembly.

Means are provided for compressing one of the members while tensioning the other, and applying the corresponding reactions to the axle on the sides in which each member lies. The result is to curve the axle with the member which is compressed lying on the convex side, and the member which is tensioned lying toward the concave side. In application to a straight roll, the parts may be adjusted to give just enough curvature to be deflected into a straight cylindrical configuration when the working load is applied to the roll. In a curved roll, the parts are adjusted to afford sufficient excess curvature for deflection by the applied load into the desired curvature when in operation.

It is significant to note that the practical limitation of roll loading is not the stress applied, but the deflection of the roll from its desired form. In the improved construction, the effect of the pre-stressing and subsequent operational loading is to reduce the net stress in the axle and to increase that in the tension and compression members, relative to the stresses in an axle which has not been pre-stressed. However, the applied stresses are not great enough to impose design limits, and these continue to be controlled by deflection. Because the positive deflection afforded directly offsets the negative deflection imposed by the load, the invention substantially increases the practical load limits for a roll of given diameter.

While the specification concludes with claims particularly pointing out the subject matter which I regard as my invention, it is believed that a clearer understanding may be gained from the following detailed description of preferred embodiments, referring to the accompanying drawings, in which:

FIGURE 1 is a longitudinal elevation in section of a straight roll made according to the invention, adjusted to eliminate transverse deflection under a load;

FIG. 2 is a view in cross-section taken along line 2—2 in FIG. 1, looking in the direction of the arrows;

FIGURE 3 is a view in cross-section taken along line 3—3 in FIG. 1, looking in the direction of the arrows;

FIG. 4 is a view similar to FIG. 1, illustrating on an exaggerated scale the upwardly convex curvature of the roll which occurs after adjustment and upon removal of the working load;

FIG. 5 is a longitudinal elevation in section of a modified roll, showing on an exaggerated scale the sagging or negative deflection of the roll when in an unadjusted condition;

FIG. 6 is a longitudinal elevation in section of an embodiment of the invention in a curved roll such as an expander roll, shown in an adjusted configuration;

Figure 9:
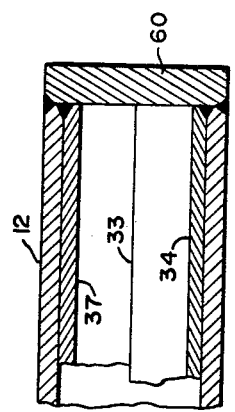
FIG. 9 is a fragmentary view in longitudinal section of one end of a modified axle assembly.

In FIGS. 1–4 a straight cylindrical roll of a type designed for use as a table roll in a Fourdrinier machine is illustrated. It includes a stationary support or axle 12 having a longitudinal internal cavity 13. The axle is normally of a hollow or annular circular cross-section which is longitudinally uniform and free of discontinuities, as shown, although other cross-sectional forms may be preferred for some applications. The hollow circular cross-section affords the maximum cross-sectional movement of inertia relative to its mass, and so has the maximum of rigidity against transverse deflection for a given diameter and weight. The rigidity of the axle is of critical importance to minimize sagging of a table roll, which supports the travelling wire 42 of the Fourdrinier machine in order to drain water from a thin suspension of paper fibers 44. If the table roll sags to any extent, the wire would assume a transverse concavity and the fiber suspension tends to run toward the center line, instead of remaining evenly distributed over the wire. This would result in the production of paper with a non-uniform thickness.

The axle 12 carries a minimum of two spool assemblies including spools 14 rotatably mounted on ball bearings 16, of which a central bearing supports adjacent ends of two spools with a gap 15 between their ends. A pair of locking rings 20 are provided at opposite ends of the assembly of spools and bearings for securing them along the support 12 by means of set screws 23. A surface sleeve 24, which is preferably made of a corrosion-resistant material such as hard rubber or fiber glass-reinforced resin is engaged circumferentially about all the spools 14, connecting them for rotation in unison with the sleeve about the axle. A pair of annular caps 26 are fastened to the outermost ends of the spool assemblies by suitable means (not shown); if desired, means may be provided to form a water-tight or lint-tight rotating seal with the axle to protect the enclosed ball bearing units.

There is a particular advantage in utilizing only two spools in a straight roll, which is more fully explained in the aforementioned U.S. Patent No. 3,099,072. Generally stated, this is that location of the axis of rotation of the spools 14 and the sleeve 24 is defined by only three points, being the centers of rotation of the three bearings 16; any curvature of the axle between these points does not affect the true axial alignment of the axis of rotation of the sleeve. By suitably adjusting the form of the support, a very precise alignment of this axis of rotation can be obtained.

The end portions of the axle 12 extend through and are mounted in spherical bearing elements 28, which are in turn mounted for canting movement within bearing members 30 on fixed supports 32. When the center of the roll is deflected upwardly or downwardly, the end portions of the axle are canted slightly and the spherical bearings accommodate this deflection.

Means for adjusting the form of the axle comprise a hemicylindrical tension member 34 and compression member 37, which are snugly but slidably received in the cavity 13, and meet along a plane 33 diametral to the axle, in which its longitudinal major axis falls. This is also the neutral axis in transverse deflection; that is to say, the axle is subject neither to compressive nor tensile stress in a diametral plane passing through this axis and perpendicular to the direction of transverse bending of the axle. The plane 33 is so oriented, and with the bending loads acting vertically as in the present example, this plane is horizontal.

The ends of the tension member 34 are welded or otherwise firmly attached to stout semi-circular end plates 35 having tapped holes 31 for threaded engagement with tension bolts 36. The compression member 37 is similarly welded to stout semi-circular end plates 40, against which compression bolts 39 bear. The tension bolts 36 pass freely through clearance holes in a pair of stout circular end abutments 38 welded to the ends of the axle 12, with their heads bearing against the outer surfaces of these abutments. The compression bolts 39, on the other hand, are threaded in tapped holes through the end abutments. Tightening of the bolts 36 and 39 subjects the members 34 and 37 to longitudinal tension and compression, respectively. These forces apply a bending moment to the axle tending to curve it upwardly with a positive deflection, as shown on a highly exaggerated scale in FIG. 4.

In the illustrated application, the roll bears the weight of the wire 42 of a Fourdrinier machine, carrying a suspension of paper fibers 44 in water. The weight of the supported load and of the roll itself tends to deflect the roll into a downwardly curved form, that is with negative deflection. In practice, the load which the roll is to carry in normal operation is placed on the sleeve 24, and the bolts 36 and 39 are tightened until the axle 12 becomes axially straight, as shown in FIG. 1. If the load were removed, the axle would then tend to curve upwardly as in FIG. 4. Thus the negative deflection induced by the supported weight is offset by a positive deflection induced by the compression and tension in the members 37 and 34. If the load is increased or decreased for any reason, the bolts 36 and 39 are adjusted to compensate and to maintain the roll in the straight configuration.

The advantages of this straightening method can be illustrated by a typical table roll of twenty feet in length supporting a Fourdrinier machine wire seventeen feet in width. A roll conforming to the invention can be 10 inches in diameter, as compared with 16 inches for a conventional roll.

The same principle of opposing a negative deflection to a positive deflection induced by weight or by other operating loads, such as tension in a sheet wrapped on the roll, can be applied to intentionally bend a roll. In general, curved rolls with rigid axles are allowed to deflect up to $\frac{1}{300}$ of their span or length under the weight of the roll, the weight of the supported material, and any tension load applied by a sheet wrapped on the roll. By applying sufficient positive bending moment to the axle by means of the tension and compression members of the invention, the roll may be positively curved, when unloaded, up to $\frac{1}{300}$ of its span in excess of the designed operational curvature. Upon applying load, a negative deflection is imposed which restores the roll toward its designed curvature. Since a negative deflection of a like extent is permissible, the load may be doubled over that which could be carried by a conventional roll of like diameter. As a corollary, a roll intended to carry a given load may have a considerably smaller diameter than was formerly permissible.

In FIG. 5 a modified roll is shown which has a series of spools 17 each mounted on a bearing 16. The bearings are spaced apart by annular spacers 22, and the roll assembly is located along the axle 12 by means of a pair of collars 20 secured by set screws 23. Parts similar to those of the foregoing embodiment are similarly numbered. Each spool 17 rotates on the axis of its individual bearing 16, determined by the local inclination of the support 12. Each of the spacers 22 engages the adjacent bearings at only one point about its circumference, on the concave of the axle, that is, at the top in FIG. 5; a gap exists at all other points around the circumference. The roll is shown unadjusted, with the sag or negative deflection greatly exaggerated.

By tightening the bolts 36 and 39, a positive, upwardly-convex curvature can be imposed on the axle and the roll. This curvature is limited by the engagement of the spacers 22 with the bearings 16 at the bottom of the roll, and the spacing of the collars 20 should be set according to the desired operating form of the roll. Since the deflection induced by the load can be offset by proper adjustment, the roll can support a substantially greater load than a conventional roll of the same diameter and length.

Figure 7:
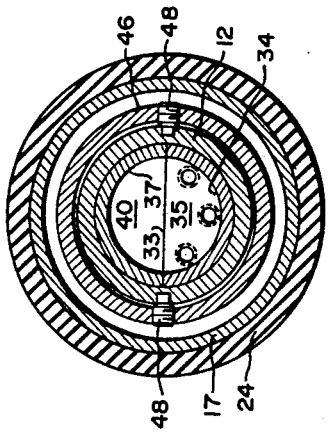
FIG. 7 is a view in cross-section taken along line 7—7 in FIG. 6 looking in the direction of the arrows.

Another modification is shown in FIGS. 6 and 7 in an adjustably curved roll, with parts similar to those of the preceding embodiments similarly numbered. A series of anuular spacer elements 45 and 47 have their abutting ends alternately internally and externally beveled to maintain full circumferential contact when the axle is curved. A pair of locating rings 46 are pivotally secured to the axle by means of set screws 48, which have trunnion points received in the outer surface of the axle 12 along transverse axes which lie in the plan 33, perpendicular to the vertical plane of transverse bending of the roll. The locking rings 46 are thus free to tilt, as shown in FIG. 6, to accommodate the tilting of the bearings 16 as the axle is curved. The operation of the device is otherwise similar to that of the embodiment of FIG. 5.

Figure 8:
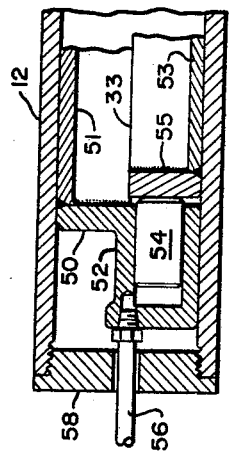
FIG. 8 is a fragmentary view in longitudinal cross-section of one end of an axle assembly having an alternative adjustment means.

In place of the tension and compression bolts 36 and 39, other means may be used to apply longitudinal tension and compression. One such means as shown in FIG. 8, comprising a fluid pressure actuator including a cylinder 52 integrally cast in a circular end plate 50, which replaces one of the semi-circular end plates of preceding embodiments, being welded to a tension member 51. A piston 54 is slidably received in the cylinder 52 and bears against the semi-circular end plate 55 of the compression member 53. A fluid pressure conduit 56 extends through a clearance opening in an end abutment 58 threaded in the axle 12, and thence into the cylinder 52. The application of fluid pressure applies compression loading, to the right as viewed in FIG. 8, to the compression member 53, and a corresponding tension toward the left to the member 51. A similar actuator may be used at the right-hand end of the axle, but this is not illustrated. The operation of the device is similar to that of the preceding embodiments, but has the advantage of greater ease in adjusting the curvature of the roll, as it is only necessary to alter the applied fluid pressure, rather than to adjust the bolts 36 and 39.

In the embodiments thus far illustrated, tension and compression means comprising bolts or fluid actuators have been applied to both ends of the axle 12, but it is feasible to use them at only one end. This can be done by omitting the semi-circular end plates 35 and 40 at one end of the assembly, and welding the corresponding end of the axle 12 to the members 34 and 37, as shown in FIG. 9. A circular end abutment 60 is subsequently welded to the end of the axle. It is not essential to weld the compression member 37 to the axle, because it will rest against the abutment 60 in any case; but it may be more convenient to weld this member along with the tension member 34.

By applying a tension load to the member 34, and a compression load to the member 37, by means acting at the opposite end of the axle, the same bending operation results. The members 34 and 37 continue to be free to slide relative to one another throughout their lengths, up to the ends at which they are joined to the axle. The compression in the member 37 and the tension in the member 34 apply a moment which deflects the axle. Using this bending method, the relative displacement of the end caps 35 and 40 at the opposite end of the axle must be double the displacement required in embodiments having bending devices at each end, in order to secure the same degree of curvature; the members 34 and 37, being fixed relative to one another at one end, cannot provide any of the necessary relative displacement at this end.

What I claim is:

1. An adjustable-deflection roll comprising a stationary axle comprising a circular cylinder having a substantially uniform cross-section and having a longitudinal internal cavity of circular cylindrical form, and a longitudinally-split circular cylindrical hollow tube forming a hemicylindrical compression member and a hemicylindrical tension member received snugly within said cavity and extending longitudinally therein to contribute to the cross-sectional moment of inertia of said axle, and lying substantially on opposite sides of the neutral axis of transverse bending of said axle, said members meeting in longitudinally-slidable relation along a plane passing through said neutral axis; a roller rotatably mounted on said axle; means constructed and arranged for longitudinally compressing said compression member and applying a reaction in tension to said axle on one side of said axis; and means constructed and arranged for longitudinally tensioning said tension member and applying a reaction in compression to said axle on the opposite side of said axis; whereby the transverse deflection of said axle may be adjusted to or from a longitudinally straight configuration.

2. A roll as recited in claim 1, in which said members are hollow hemicylindrical shells.

3. A roll as recited in claim 1, in which said compressing and tensioning means comprise threaded members, said axle being provided with end abutments, and said threaded members threadedly engaging at least one of said abutments and extending into said cavity for engagement with said members.

4. A roll as recited in claim 1, in which said compressing and tensioning means comprise at least one fluid-pressure actuator.

5. A roll as recited in claim 4, in which said fluid-pressure actuator comprises a cylinder acting on one of said members and a piston acting on the other of said members.

6. A roll as recited in claim 1, in which said compressing and tensioning means act on said members at either longitudinal end thereof.

7. A roll as recited in claim 1, in which said compressing and tensioning means act on said members only at first corresponding ends thereof, said tension member being secured to said axle at a second corresponding end thereof.

References Cited

UNITED STATES PATENTS

| 581,514 | 4/1897 | McGiehan | 114—90 |
| 2,898,662 | 8/1959 | Robertson. | |
| 3,328,866 | 7/1967 | Robertson. | |
| 3,389,450 | 6/1968 | Robertson | 29—116 |

WALTER A. SCHEEL, Primary Examiner

LEON G. MACHLIN, Assistant Examiner

U.S. Cl. X.R.

26—63; 64—31; 118—244